United States Patent [19]
Soberay

[11] Patent Number: 6,106,269
[45] Date of Patent: Aug. 22, 2000

[54] VACUUM INJECTION PRESS

[76] Inventor: Thaddeus Soberay, 10523 Greenhaven, Brecksville, Ohio 44141

[21] Appl. No.: 09/108,784

[22] Filed: Jul. 2, 1998

Related U.S. Application Data

[60] Provisional application No. 60/052,538, Jul. 15, 1997.
[51] Int. Cl.[7] .................................................. B29C 43/10
[52] U.S. Cl. ........................................ 425/405.1; 425/406
[58] Field of Search ................................ 425/556, 405.1, 425/406, 151, 144

[56] References Cited

U.S. PATENT DOCUMENTS

| | | |
|---|---|---|
| 3,223,352 | 12/1965 | Fuller et al. . |
| 3,407,673 | 10/1968 | Slezak . |
| 3,551,253 | 12/1970 | Slezak . |
| 3,899,143 | 8/1975 | Slezak . |
| 4,061,525 | 12/1977 | Slezak . |
| 4,566,854 | 1/1986 | Slezak . |
| 4,666,551 | 5/1987 | Soberay et al. . |
| 4,929,012 | 5/1990 | Slezak . |
| 5,017,121 | 5/1991 | Hehl ........................................ 425/151 |
| 5,024,477 | 6/1991 | Slezak . |
| 5,163,727 | 11/1992 | Slezak et al. . |
| 5,393,210 | 2/1995 | Kasai et al. ............................. 425/556 |
| 5,423,670 | 6/1995 | Hamel ..................................... 425/144 |

FOREIGN PATENT DOCUMENTS

| | | |
|---|---|---|
| 60-79542 | 5/1985 | Japan . |
| 4-74612 | 3/1992 | Japan . |
| 6-39857 | 2/1994 | Japan . |

*Primary Examiner*—Tim Heitbrink
*Attorney, Agent, or Firm*—Watts, Hoffmann, Fisher & Heinke Co.

[57] ABSTRACT

A vacuum injection press including frame structure defining a sealable molding chamber having a least one access opening by which molded products are removed. Access to the chamber is controlled by a door assembly that is movable between opened and closed positions. Upper and lower bolsters mount first and second mold portions. The lower bolster is mounted for substantially vertical reciprocal movement towards and away from the upper, fixed bolster and a fluid pressure actuator is used to maintain clamping contact between the first and second mold portions when the lower bolster is moved into a clamped position with respect to the upper bolster. An injection molding unit is located outside of the chamber and provides molding compound to a cavity defined by the mold portions. Molding compound is delivered from the injection unit to the cavity defined by the mold portions via an injection nozzle forming part of the upper, fixed bolster. An unloading mechanism is provided which moves the lower mold portion to an unload position, located outside the vacuum chamber at which location the molded products are moved. To facilitate movement of the lower mold portion to the unload position, a semi-coiled flexible conduit is used that resides within a milled slot formed in the lower bolster. As the lower mold portion moves to the unload position, the conduit moves out of the milled slot to accommodate the outward movement. Upon retraction, the conduit again coils into the milled slot.

11 Claims, 3 Drawing Sheets

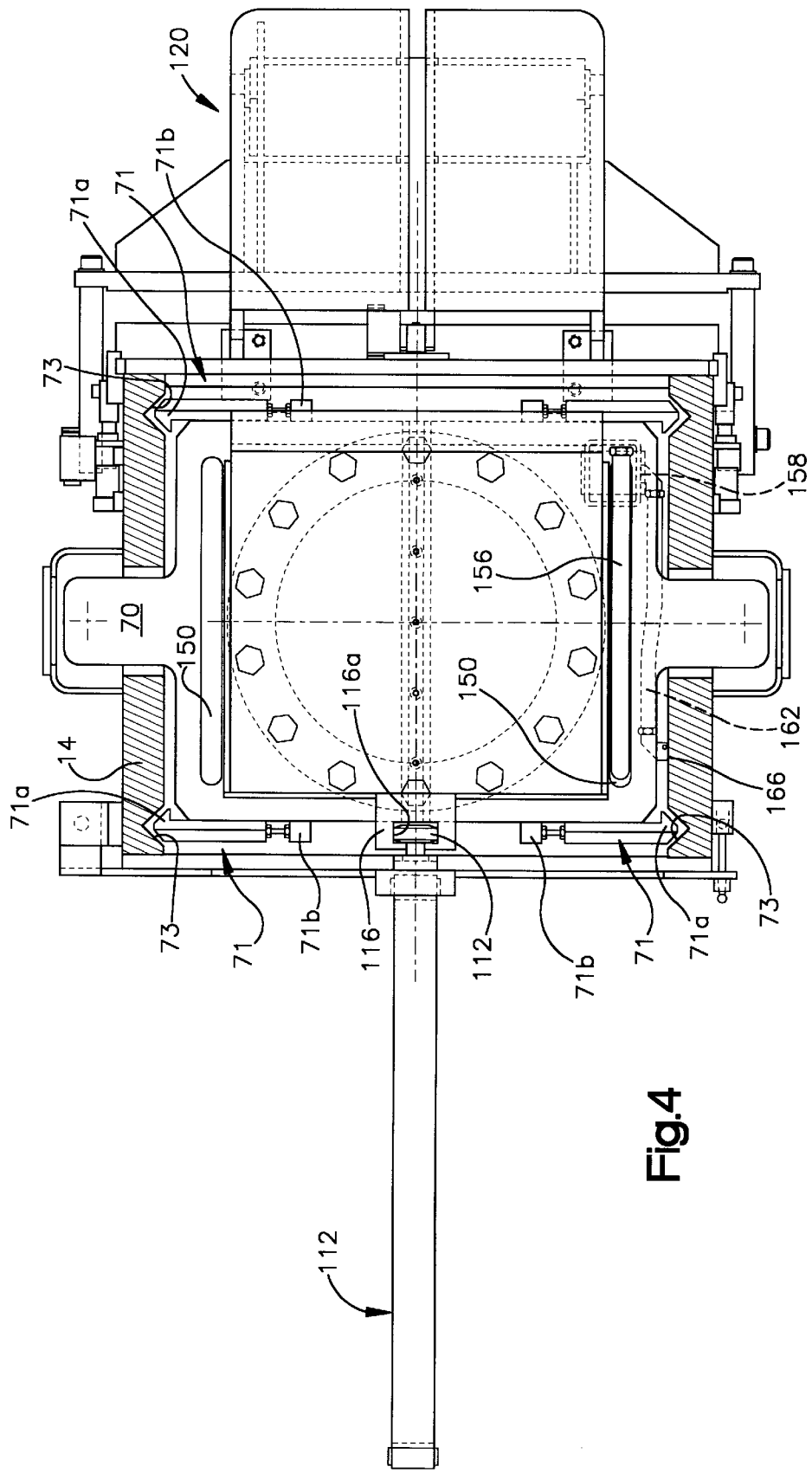

VACUUM INJECTION PRESS

This application claims benefit of U.S. Provisional No. 60/052,538 filed Jul. 15, 1997.

TECHNICAL FIELD

The present invention relates generally to molding and, in particular, to a vacuum injection press.

BACKGROUND ART

Molding machines currently exist which utilize a vacuum chamber to aid in the molding process. An example of such a press is disclosed in U.S. Pat. No. 4,666,551, which is hereby incorporated by reference. These types of machines have been used typically to produce low volumes of molded products and/or multi-layer circuit boards. When used to produce molded products, mold cavities are filled with "preforms" by the operator. The press closes and the molding chamber is evacuated. The products are then molded while being subjected to vacuum, heat and mechanical clamping forces exerted by the mold halves.

Vacuum techniques have also been tried in an effort to improve injection molding. In the past, specialty vacuum molds having discharge ports have been created to remove air from the cavity. These special vacuum molds can be very expensive and the ports are subject to plugging which ultimately causes degradation of the molded product.

DISCLOSURE OF INVENTION

The present invention provides a new and improved molding machine and method which utilizes injection molding in combination with vacuum to provide a cost effective and efficient molding system.

The vacuum injection press of the present invention includes a frame structure that defines a molding chamber, the chamber having at least one access opening by which access to an injection mold is provided. A door assembly is movable between open and closed positions and is operative to block access to the chamber when in a closed position. When the door assembly is closed, the molding chamber is sealed and during the molding cycle, is connected to a source of vacuum. The press includes first and second bolsters for supporting first and second mold portions. At least one of the bolsters is mounted for movement towards and away from the other bolster. A fluid pressure operated ram maintains clamping contact between the first and second mold portions when the bolsters are moved into an abutting or clamped position which, in effect, closes the mold.

An injection unit is located outside of the chamber and provides a source of molding compound for a cavity or cavities defined by the mold portions. The apparatus includes a passage for delivering the molding compound from the injection unit to the cavity defined by the mold portions (which are located within the chamber).

According to a feature of the invention, the machine includes pull back cylinders operatively connected to one of the bolsters which are operative to move the one bolster in a direction away from the other bolster at the conclusion of a molding cycle.

According to another feature of the invention, an unloading mechanism is operative to move one of the mold portions laterally, out through the access opening to a mold discharge position. This occurs at the conclusion of the molding cycle.

According to still other features of the invention, a first platen is located between the first bolster and the first mold portion and a second platen is located intermediate the second bolster and the second mold portion. According to this feature of the invention, the mold portion that is moved through the access opening to the discharge position is supported for movement by the first platen.

According to still another aspect of this feature of the invention, a fluid pressure operated actuator is used to move the first platen from the molding position to the mold discharge position.

According to further features of the invention, a recess is formed in one of the bolsters which is adapted to receive at least one conduit extending between an interface connector and an associated platen. The conduit may be used for example to connect electrical power from outside the vacuum chamber to heaters located within the platen.

A loading mechanism is also disclosed which enables the lower platen to be moved from a molding position to a loading position that is located outside of the vacuum chamber. This is achieved by a actuator which includes a rod engageable with the lower platen whenever the lower platen moves to an unload position.

Additional features will become apparent and a fuller understanding obtained by reading the following detailed description made in connection with the accompanying drawings.

BEST MODE FOR CARRYING OUT THE INVENTION

Figure 1:
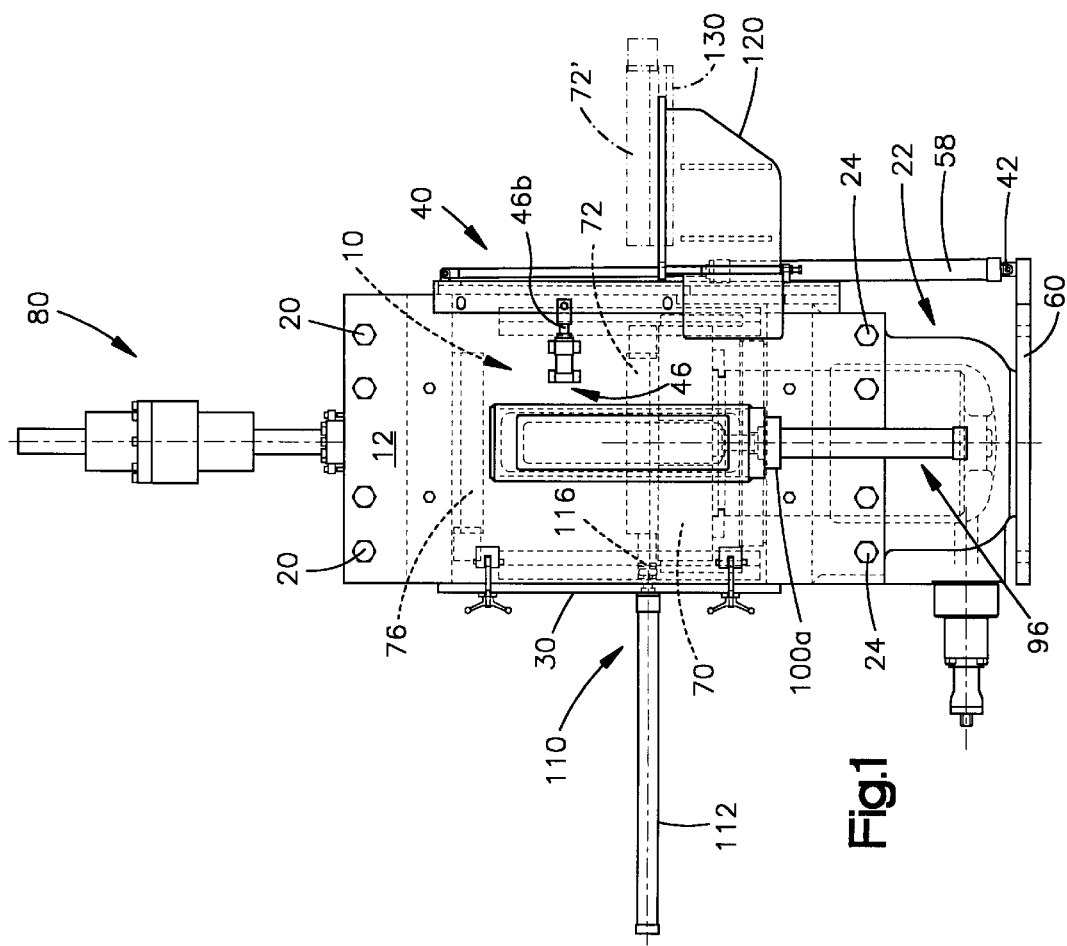
FIG. 1 is a side elevational view of a vacuum injection press constructed in accordance with a preferred embodiment of the invention.

FIG. 1 illustrates the overall construction of a vacuum injection press constructed in accordance with the preferred embodiment of the invention. The press includes a molding chamber indicated generally by the reference character 10, which is defined within a frame structure formed by a pair of spaced apart side plates 12, 14. The side plates 12, 14 also serve as load bearing members and define two of inner walls 12a, 14a of the molding chamber 10. Upper ends of the side plates are secured to a fixed bolster 18, by bolts 20. Lower ends of the side plates 12, 14 are rigidly attached to a primary hydraulic ram assembly 22 which, in the preferred embodiment, includes a casting to which the lower ends of the side plates are bolted as by bolts 24.

The side plates 12, 14 together with the fixed bolster 18 and the primary ram 22 define front and rear openings to the process chamber 10. Access to the chamber via the rear opening is controlled by a hinged, rear door 30 which, when closed, sealingly engages side plate end surfaces, a side bolster surface and a sealing surface defined by the main hydraulic assembly 22, whereby the rear opening is sealed.

Access to the molding chamber via the front opening is controlled by a door assembly indicated generally by the reference character 40. In the preferred embodiment, the door assembly 40 is of the type disclosed in U.S. Pat. No. 4,666,551, which is hereby incorporated by reference. More specifically, the door assembly 40 includes a door frame which is pivotably movable about a pivot axis 42, towards and away from the front opening. Tilt cylinders 46, 48 having cylinders 46a, 48a attached to respective side plates 12, 14 each include an extendable rod attached to the door frame assembly 40 (only rod 46b of the actuator 46 is shown). Extension of the tilt cylinders 46, 48 moves the door assembly away from the front opening about its pivot axis 42. The door assembly includes a vertically movable door 40a which is slidably held between two vertical door frame members 54, 56. A fluid pressure door actuating door cylinder 58 is pivotally attached to a base plate 60 and has its rod end 58a attached to the door 40a such that extension and retraction of the actuator 58 raises and lowers the door 40a. In its raised position, shown in FIG. 1, the door 40a overlies and seals the front opening (when the tilt actuators 46, 48 are retracted).

A moving bolster 70 is located within the vacuum chamber 10 and is operatively connected to the main hydraulic ram 22. The moving bolster 70 in turn mounts a bottom platen 72 to which the lower half of an injection mold (not shown) is attached.

An upper platen 76 is attached to the upper bolster 18 and it is a structure to which an upper portion of an injection mold (not shown) is attached.

During a molding cycle, the mold portions mounted to the respective platens 72, 76 are brought together to define an enclosed cavity that is filled with molding compound.

The main hydraulic ram 22 not only raises the lower mold portion (which is mounted to the bottom platen 72), but continues to apply significant compression forces to the injection mold portions in order to maintain closure of the mold during the injection process.

Figure 2:
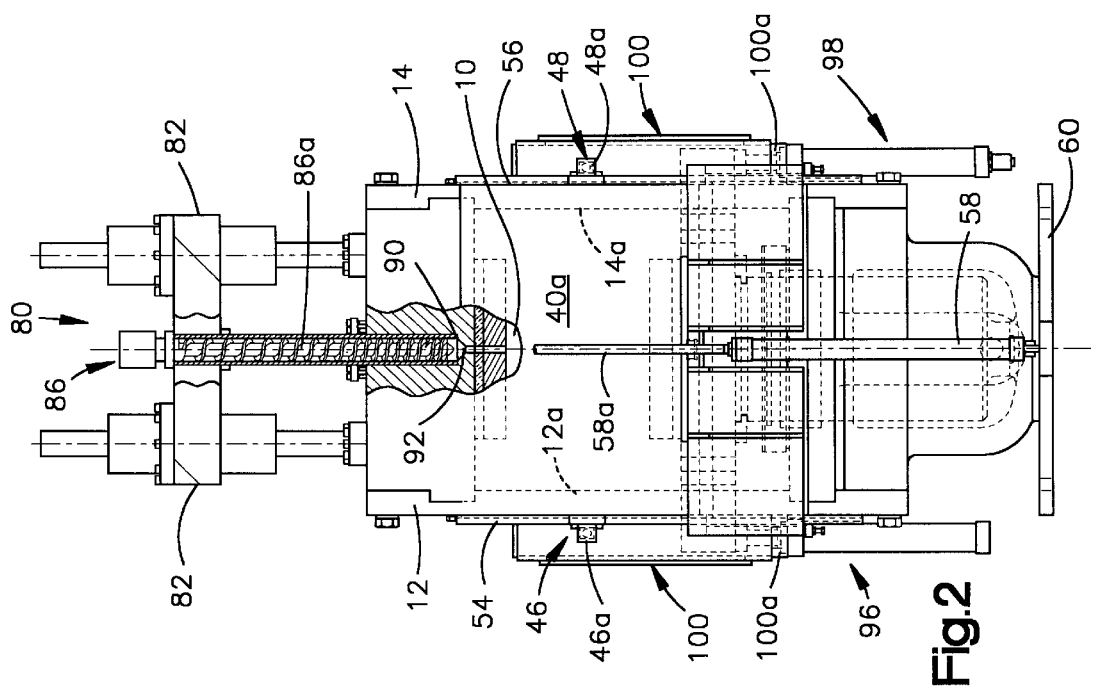
FIG. 2 is another side elevational view of the vacuum injection press, rotated 90° from the position shown in FIG. 1 and with portions broken away to show interior details.

As seen best in FIG. 2, a conventional injection mold unit 80 is mounted to the top of the upper bolster 18 and outside the vacuum chamber 10. In the illustrated embodiment, the injection mold unit 80 includes a pair of fluid operated actuators 82 which provide the required reciprocating motion to an injection screw assembly 86. As is conventional, the screw assembly includes a rotatable screw 86a that is rotated in order to advance molding compound into an injection region 90 downstream of the end of the screw 86a. Once the region 90 is filled, rotation of the screw 86a is terminated and the entire screw assembly is then advanced towards an injection nozzle 92 whereby the mold material is forced through the nozzle 92 and into the mold cavity (which communicates with the injection nozzle). The injection screw assembly 86 is then retracted to its initial position by the actuators 82 and again rotated to advance material into the injection region 90 downstream of the screw 86a.

At the conclusion of a molding cycle, the mold halves are separated using a pair of pull back cylinders 96, 98. In the preferred embodiment, the rod ends of each pull back cylinder are located within a vacuum tight housing 100 and are attached to laterally extending ears formed on the movable bolster 70. In particular, the vacuum-tight pull back cover 100 is attached, as by welding, to each side plate 12, 14. A lower end 100a of the cover 100 is sealingly attached, as by welding, to the upper end of the associated pull back cylinder 96, 98. Consequently, the rod of each cylinder operates in a region that communicates with the interior of the vacuum chamber 10, but which is isolated from the ambient.

According to a feature of the invention, unloading of the mold is facilitated by a mechanism 110 which moves the lower platen (to which the lower mold half is attached) laterally and out through the front opening, after the door 40 is opened. In particular, a horizontally positioned fluid pressure operated actuator 112 is attached to the rear door 30. The rod of the actuator extends through an opening in the door and is reciprocally movable within the chamber 10. The bottom platen 72 includes a rod engagement bracket 116 which engages the end of the rod whenever the bottom platen 72 (which is slidably attached to the lower, moving bolster 70) is moved downwardly to the mold open position. The open position is shown in FIG. 1). When in the open position, extension of the rod forming part of the ejection cylinder 112 advances the bottom platen 72 and, hence the lower portion of the mold attached to the bottom platen, rightwardly was viewed in FIG. 1. In the preferred embodiment, the moving platen 72 is moved to the unload position (indicated by the reference character 72') atop a load table 120 at the conclusion of the injection cycle and after the front access door 40 is opened.

To achieve this feature, a "T-bar" arrangement is used to attach the bottom platen 72 to the bolster 70. A brass T-bar indicated generally by the reference character 130 is slidably held in a similarly shaped T-slot (not shown) formed in the lower, moving bolster 70. The connection provided by the T-slot directly couples the lower platen 72 to the moving bolster 70 when the bolster is moving vertically either towards or away from the upper fixed bolster 18. However, the T-slot engagement allows the lower platen to move laterally with respect to the moving bolster 70 when the moving bolster is lowered to its open position. To facilitate this sliding engagement, the T-bar may be made of brass.

FIG. 4 illustrates the details of the mechanism by which the actuator 112 engages the lower platen 72. The bracket 116 extends rearwardly from the lower platen 72 and defines a T-shaped slot 116a. The end of the rod of the actuator 112 mounts a disc like member 112a which is sized to be received within the slot 116a. It should be apparent by viewing FIGS. 3 and 4, that when the lower platen 72 is moved to the mold open position (i.e., when the moving bolster is retracted and moved downwardly, the member 112a enters the slot 116a and is thereby coupled to the lower platen 72.

According to the preferred embodiment of the invention, the moving bolster 70 is guided by thermal expansion, compensating guides 71. As seen best in FIG. 4, the thermal compensating guides are mounted to the bolster 70 and each includes a V-shaped head or shoe 71a which engages a corresponding V-shaped track 73 formed in the side plates 12, 14. The shoes are preferably made of brass and are mounted to an adjustable guide block 71b. The guide blocks are secured to the moving bolster 70. The lateral position of each shoe 71a is adjustable by its associated guide block 71b.

In normal operation, the platen is heated by steam, oil or electric cartridge heaters. In order to provide this heating feature, flexible hoses or wiring must extend from the fixed portion of the machine to the moving platen. This wiring or hosing must also have sufficient length in order to allow the platen to move to its unload position (shown in FIG. 1 and indicated by the references character 72'). In order to provide this feature, slots cut through the moving bolster 70 are provided which the hose or wiring loop down into as the bolster 70 moves vertically or as the platen 72 moves laterally.

Figure 3:
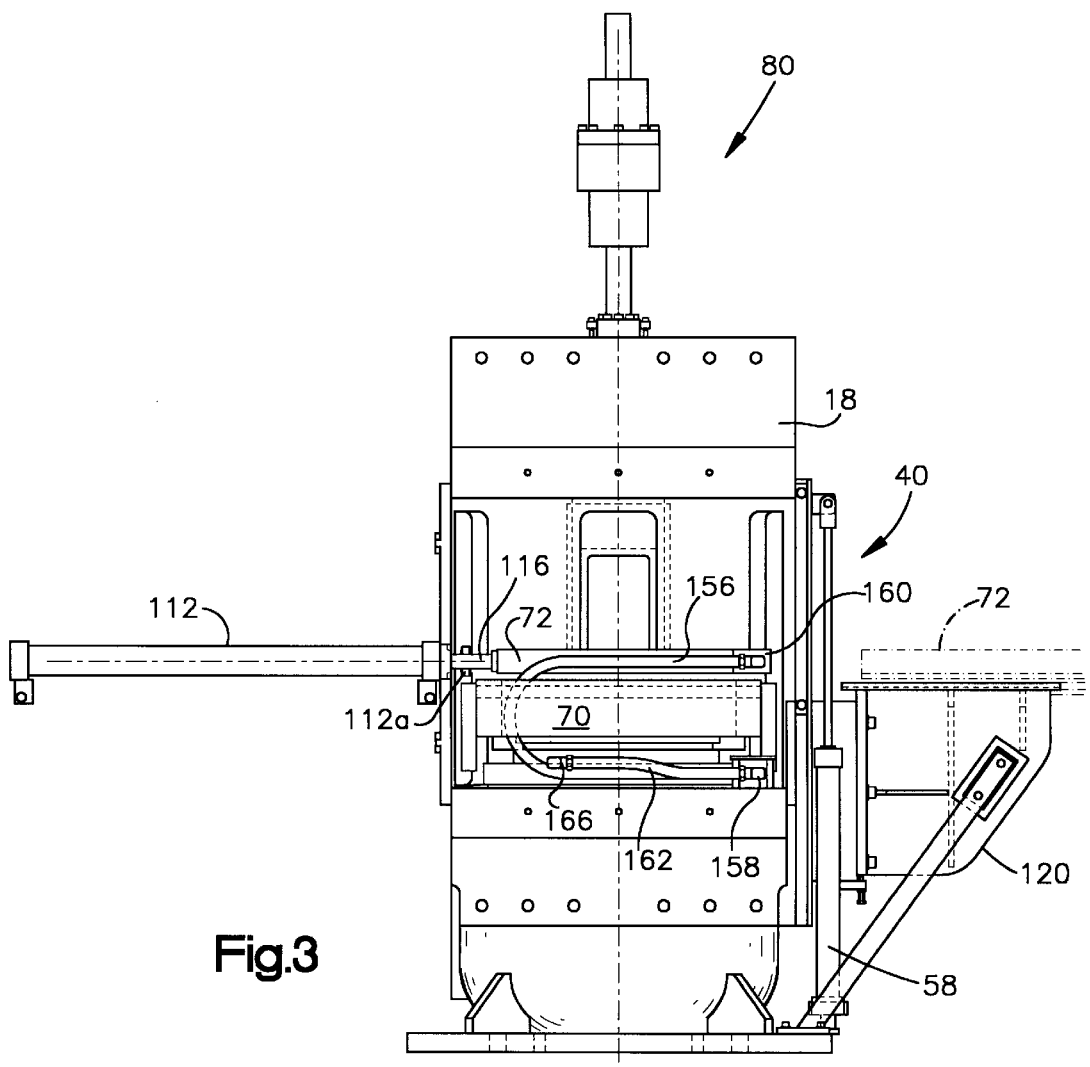
FIG. 3 is another side elevational view of the vacuum press with parts removed to show interior detail; and, FIG. 4 is a sectional view as seen from the plane indicated by the line 4—4 in FIG. 3.

This feature can best be seen in FIGS. 3 and 4. Referring to FIG. 4, the moving bolster 70 includes a pair of vertically oriented, milled slots 150, 152. In the illustrated embodiment, only the slot 152 is shown as being used. Referring also to FIG. 3, a flexible conduit 156 extends from a junction block 158 to a connector 160 on the bottom platen 72. The conduit 156 may contain wires for providing electrical power to heaters (not shown) forming part of the lower platen 72. As seen best in FIG. 4, a connecting conduit 162 extends from an interface connector 166 to the junction block 158. The interface connector 166 provides a sealed interface through which the wires contained in the conduit pass from inside of the vacuum chamber to the outside of the machine.

When the lower platen 72 is in the position shown in FIG. 3, the conduit 156 folds or coils into a U-shaped configuration in the bolster slot 150. When the bottom platen 72 is moved laterally to its loading position by the hydraulic cylinder 112, the flexible conduit 156 moves out of the milled slot 150 to accommodate the outward movement in the lower platen 72. The loading position 72' is shown in phantom in FIG. 3.

The disclosed apparatus provides an efficient and cost effective injection molding machine which eliminates the need for preforms or special vacuum molds and in which unloading of the mold is facilitated.

Although the invention has been described with a certain degree of particularity, it should be understood that those skilled in the art can make various changes to it without departing from the spirit or scope as hereinafter claimed.

I claim:

1. A vacuum injection press, comprising:
    a) a frame structure defining a sealable molding chamber, said chamber having at least one access opening by which molded products are removed;
    b) a door assembly movable between open and closed positions, and operative to block access to said chamber when in a closed position;
    c) first and second bolsters for supporting first and second mold portions within said sealable molding chamber;
    d) means mounting one of said bolsters for movement towards and away from said other bolster;
    e) fluid pressure operated means for maintaining clamping contact between said first and second mold portions when said one bolster is moved to a clamped position with respect to said second bolster;
    f) an injection molding unit located outside of said chamber for providing molding compound to a cavity defined by said mold portions;
    g) means for delivering said molding compound from said injection unit to said cavity defined by said mold portions; and,
    h) a source of vacuum for connection to said molding chamber whereby said mold portions are subject to vacuum during a molding cycle.

2. The press of claim 1, further including pull back cylinders operatively connected to said first bolster and operative to move said first bolster in a direction away from said other bolster.

3. The press of claim 1, further including an unloading mechanism which is operative to move one of said mold portions laterally and out through said access opening at the conclusion of a molding cycle.

4. The press of claim 1, wherein a first platen is located intermediate said first bolster and said first mold portion and a second platen is located intermediate said second bolster and second mold portion.

5. The press of claim 4, wherein said first mold portion is moveable between a molding position and a discharge position by said first platen.

6. The press of claim 5, wherein a fluid pressure actuator is used to move said first platen from said molding position to said mold discharge position.

7. A vacuum injection apparatus, comprising:
    a) frame structure defining a sealable molding chamber, the chamber having at least one access opening by which molded products are removed;
    b) upper and lower bolsters for supporting upper and lower platen assemblies;
    c) means mounting at least one of said bolsters for substantially vertical movement towards and away from said other bolster;
    d) means for maintaining clamping contact between said upper and lower platen assemblies when said one bolster is moved to a clamped position with respect to said other bolster;
    e) an injection molding unit located outside of said chamber for providing molding compound to a cavity defined by a mold assembly located within said sealable molding chamber and held by said platen assemblies;
    f) means for delivering said molding compound from said injection unit to said cavity defined by said mold assembly; and
    g) a source of vacuum for connection to said molding chamber whereby said mold assembly is subject to vacuum during a molding cycle.

8. The apparatus of claim 7 wherein said means for maintaining clamping contact is provided by a fluid pressure operated actuator.

9. The apparatus of claim 7 wherein said lower bolster defines a recess for receiving conduit means that interconnects said lower platen assembly with a interface connector by which communication is established between the outside of said apparatus and said lower platen assembly.

10. The apparatus of claim 8 wherein said conduit means provides an electrical connection between a heater in said lower platen assembly and a power source located outside said apparatus.

11. The apparatus of claim 7 wherein said frame structure includes first and second side plates, each side plate defining trackways engageable by thermal compensating guides forming part of said lower bolster.

* * * * *